(12) United States Patent
Antinori et al.

(10) Patent No.: US 12,204,874 B2
(45) Date of Patent: *Jan. 21, 2025

(54) GENERATION OF SERVICE-LEVEL OBJECTIVE SPECIFICATIONS USING JAVA ANNOTATION

(71) Applicant: Red Hat, Inc., Raleigh, NC (US)

(72) Inventors: Paolo Antinori, Milan (IT); Eric Wittmann, Hartford, CT (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,575

(22) Filed: Aug. 8, 2023

(65) Prior Publication Data

US 2023/0393815 A1 Dec. 7, 2023

Related U.S. Application Data

(63) Continuation of application No. 17/529,952, filed on Nov. 18, 2021, now Pat. No. 11,768,665.

(51) Int. Cl.
*G06F 8/10* (2018.01)
*G06F 8/41* (2018.01)
*G06F 8/73* (2018.01)

(52) U.S. Cl.
CPC ............... *G06F 8/10* (2013.01); *G06F 8/427* (2013.01); *G06F 8/44* (2013.01); *G06F 8/73* (2013.01)

(58) Field of Classification Search
CPC ... G06F 8/10; G06F 8/427; G06F 8/44; G06F 8/51; G06F 8/73; G06F 8/315
See application file for complete search history.

(56) References Cited

U.S. PATENT DOCUMENTS

| 10,108,442 B1 | 10/2018 | Camarda Silva Folco et al. |
| 2003/0023957 A1 | 1/2003 | Bau, III et al. |
| 2013/0073994 A1* | 3/2013 | Liao ............ G06Q 10/06 715/762 |
| 2014/0337276 A1 | 11/2014 | Iordanov |

(Continued)

OTHER PUBLICATIONS

Service-level objectives, Wikipedia, 2020, 4 pages, [retrieved on May 22, 2024], Retrieved from the Internet:<URL:https://web.archive.org/web/20200701213309/https://en.wikipedia.org/wiki/Service-level_objective>.*

(Continued)

*Primary Examiner* — Geoffrey R St Leger
(74) *Attorney, Agent, or Firm* — Kilpatrick Townsend & Stockton LLP

(57) ABSTRACT

Systems and methods for generating SLO specifications using annotations are generally described. In various examples, first source code associated with a first computer-implemented service is received. In various cases, a first annotation in the first source code may be received. The first annotation may include first metadata defining a name of an SLO specification. A second annotation in the first source code may be received. The second annotation may include second metadata defining a service-level objective (SLO) of a first aspect of the first computer-implemented service. In some cases, the first computer-implemented service may be executed using the first source code. In various examples, the SLO specification may be generated based on the first annotation and the second annotation.

18 Claims, 7 Drawing Sheets

(56) References Cited

U.S. PATENT DOCUMENTS

2017/0141992 A1* 5/2017 Borisov .............. H04L 43/0852
2019/0141120 A1 5/2019 Bernat et al.
2020/0159854 A1 5/2020 Liang et al.
2021/0258265 A1 8/2021 Bernat et al.

OTHER PUBLICATIONS

Griebler, Dalvan, et al., Service Level Objectives via C++11 Attributes, European Conference on Parallel Processing, 2018, 12 pages, [retrieved on Sep. 11, 2024], Retrieved from the Internet: <URL:https://link.springer.com/chapter/10.1007/978-3-030-10549-5_58>.*
USPTO; Non-Final Office Action for U.S. Appl. No. 17/529,952 dated Dec. 15, 2022, 10 pages.
Examination Report of European application No. 22151652.9 (20211215EP) dated Feb. 9, 2024: pp. 1-4.

* cited by examiner

GENERATION OF SERVICE-LEVEL OBJECTIVE SPECIFICATIONS USING JAVA ANNOTATION

CROSS-REFERENCE TO RELATED APPLICATIONS

This application is a continuation of and claims priority to U.S. patent application Ser. No. 17/529,952, filed Nov. 18, 2021. The disclosure of the foregoing application is incorporated herein by reference in its entirety.

BACKGROUND

Providers of compute services such as software developers and web service developers often enter into service-level agreements (SLAs) with customers. An SLA is a commitment to providing certain agreed-upon aspects of the service. For example, an SLA may define certain levels of availability, quality of a service, and/or may define various roles and responsibilities for the service. An SLA typically includes service-level objectives (SLOs). While an SLA is the overall agreement specifying the service to be provided, how the service is supported, responsibilities, etc., SLOs define specific measurable characteristics of the SLA. For example, an SLO may comprise one or more quality of service (QoS) measurements that may define minimum levels of throughput, quality, availability, etc. SLO specifications may be machine-readable documents that may define the SLOs of a service and which may be ingested by other software/systems in order to verify that SLOs are being met and/or to monitor performance.

SUMMARY

The present disclosure provides a new and innovative system, methods and apparatus for generation of SLO specifications using annotations. In an example, first source code associated with a first computer-implemented service may be received. In various cases, a first annotation in the first source code may be received. The first annotation may include first metadata defining a name of an SLO specification. In various examples, a second annotation in the first source code may be received. The second annotation may include second metadata defining a service-level objective (SLO) of a first aspect of the first computer-implemented service. In some examples, the first computer-implemented service may be executed using the first source code. In various examples, the SLO specification may be generated based on the first annotation and the second annotation. In various cases, the SLO specification may include the name and a definition of the SLO of the first aspect of the first computer-implemented service.

In another example, a system may comprise at least one processor and non-transitory computer-readable memory. The non-transitory computer-readable memory may store instructions that, when executed by the at least one processor are configured to receive first source code defining a first computer-implemented service. The non-transitory computer-readable memory may store instructions that, when executed by the at least one processor are configured to receive a first annotation in the first source code, the first annotation comprising first metadata defining a name of an SLO specification. The instructions, when executed by the at least one processor may be further configured to receive a second annotation in the first source code, the second annotation comprising second metadata defining a service-level objective (SLO) of a first aspect of the first computer-implemented service. In some examples, the instructions, when executed by the at least one processor may be further configured to execute the first computer-implemented service using the first source code. In various examples, the instructions, when executed by the at least one processor may be further configured to generate the SLO specification based on the first annotation and the second annotation. The SLO specification may include the name and a definition of the SLO of the first aspect of the first computer-implemented service.

In yet another example, another system may be described. The system may comprise an integrated development environment. In some examples, the system may comprise a compiler. In still other examples, the system may comprise an annotation processor. In some cases, the integrated development environment may be effective to receive first source code associated with a first computer-implemented service. In various examples, the integrated development environment may be further effective to receive a first annotation in the first source code, the first annotation comprising first metadata defining a name of an SLO specification. In some examples, the integrated development environment may be further effective to receive a second annotation in the first source code, the second annotation comprising second metadata defining a service-level objective (SLO) of a first aspect of the first computer-implemented service. In various examples, the compiler may be effective to compile the first source code to generate executable code for the first computer-implemented service. In some other examples, the annotation processor may be effective to receive the first annotation from the first source code. In some examples, the annotation processor may be further effective to receive the second annotation from the first source code. In still other examples, the annotation processor may be effective to generate the SLO specification based on the first annotation and the second annotation. The SLO specification may include the name and a definition of the SLO of the first aspect of the first computer-implemented service.

Additional features and advantages of the disclosed method and apparatus are described in, and will be apparent from, the following Detailed Description and the Figures.

DETAILED DESCRIPTION OF EXAMPLE EMBODIMENTS

Figure 1:
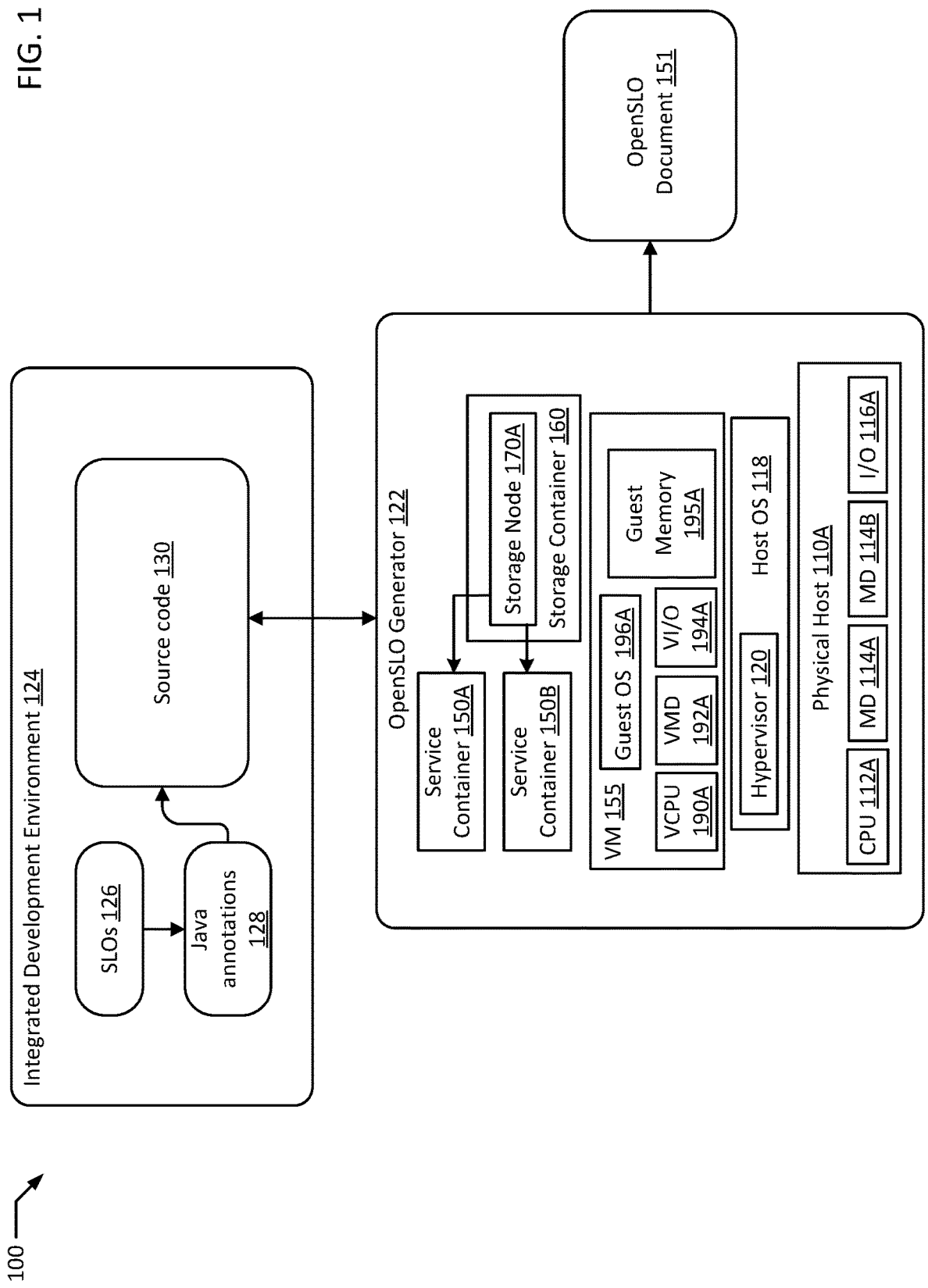
FIG. 1 is a block diagram of an OpenSLO generator configured in communication with an integrated development environment, according to various examples of the present disclosure.

OpenSLO is an open-source service level objective (SLO) language that declaratively defines reliability and performance targets using a YAML specification. SLOs include reliability targets for various aspects of computer-implemented services that allow organizations to determine how to create, operate, and run cloud-based services and/or applications. SLOs are important metrics that are used to set the operational expectations of computer-implemented services. An SLO specification is a standardized machine-readable definition format for defining the SLOs for a given computer-implemented service. An example of a standardized SLO specification is the OpenSLO specification promulgated by Nobl9 among others. Since OpenSLO specifications and other SLO specifications define SLOs in a standardized, vendor-agnostic way (excluding platform-specific details), OpenSLO specifications can be easily ingested by other systems and used to programmatically monitor the performance of the computer-implemented services to which the SLOs pertain. The various techniques described herein may be used in conjunction with any SLO specifications. However, for brevity, the OpenSLO specification will hereinafter be referred to for illustrative purposes.

However, there is currently no way to automatically generate OpenSLO specifications at the code level of the underlying computer-implemented service to which the SLOs pertain. As such, OpenSLO documents are manually generated by developers. Generation of the OpenSLO documents can be a tedious and time-intensive operation. Additionally, such documents may become outdated over time as changes are made to the underlying services. Developers often need to access these OpenSLO documents to ensure that their code performs well per the SLOs defined by the OpenSLO document. Developers are typically required to maintain their applications over time. However, as the code of the application changes, the manually-generated OpenSLO documents may become stale (e.g., if corresponding updates are not made to the OpenSLO documents). In some examples, OpenSLO documents may be programmatically ingested by software testing components to monitor the performance of a service. However, if stale OpenSLO documents are used, the testing may result in the wrong tests being performed wasting CPU compute time, bandwidth, memory, and/or power. The lack of availability to programmatically generate OpenSLO documents at the source code level of a computer-implemented service is a technical problem that can lead to a disconnect between the service and the reliability and performance targets for that service.

Described herein are technical solutions (e.g., systems and techniques) that may be used to automatically generate OpenSLO specifications (e.g., OpenSLO documents) using annotations in the source code. For example, Java annotations can be used to annotate a Java service interface with annotation values that logically map to the equivalent fields defined in the OpenSLO specification. Programmatic generation of OpenSLO specifications ensures that automatic testing components used to test performance of the underlying service are performing the correct tests, rather than outdated tests based on stale SLOs (which can waste compute resources). Including SLOs in the code using annotations not only automates the generation of OpenSLO specifications, but also keeps the objectives/requirements specified by the SLOs within the source code itself. This can force developers to consider their code in terms of operational requirements specified by the SLOs (and the annotations) and can be used to generate automated testing scripts that reference the OpenSLO specification. Annotations (e.g., Java annotations) can be consumed by annotation processors to generate the corresponding OpenSLO YAML descriptor (e.g., in the appropriate field of the OpenSLO specification). Additionally, annotations can be consumed by annotation processors to generate markup based documentation (e.g., HTML, PDF, etc.). Additionally, annotations can be consumed by annotation processors to generate scripts that may test the corresponding computer-implemented service according to the SLOs defined in the programmatically-generated OpenSLO specification.

Although many of the examples described herein use Java annotations to generate OpenSLO specifications, other annotations may be used depending on the programming language of the source code. For example, C#, Ruby, VB.NET, and other programming languages also support annotation integration and may be used to programmatically generate OpenSLO specifications.

FIG. 1 is a block diagram of a system 100 comprising an OpenSLO generator 122 configured in communication with an integrated development environment (IDE) 124, according to various examples of the present disclosure. The OpenSLO generator 122 may be implemented using software, hardware, and/or some combination thereof. In the example OpenSLO generator 122 depicted in FIG. 1, the OpenSLO generator 122 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

OpenSLO generator 122 may run one or more VMs (e.g., VMs 122), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OS s 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, a storage controller may additionally manage storage in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator (not shown in FIG. 1). In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

The various virtualized computing systems (e.g., service containers 150A, 150B, VM 155) may be examples of computing environments that may deploy one or more of the techniques described herein for programmatic generation of an OpenSLO document 151 using java annotations 128 of source code 130. In various examples, the service containers 150A, 150B, and/or VM 155 may be used to implement an annotation processor. An annotation processor may be a tool build in Java that is used for scanning and/or processing of annotations at compile time. An annotation processor for a certain annotation takes java code (or compiled byte code) as input and generates files as output. In the various embodiments described herein, annotation processors take source code (e.g., java code) as input and generate OpenSLO documents 151 that include the various SLOs 126 defined in the java annotations 128. In various examples, the OpenSLO document 151 may be in YAML. Additionally, OpenSLO "documents" and "specifications" may generally refer to any OpenSLO data that is generated according to the OpenSLO standard using source code annotations.

The foregoing example is merely one possible implementation of an OpenSLO generator 122. The actual deployment of the various services and/or systems of the OpenSLO generator 122 are implementation-specific details and may be modified as desired in accordance with the present disclosure. The OpenSLO generator 122 may be deployed across any number of physical computing devices and/or virtualized computing environments, depending on the desired implementation.

IDE 124 may be a software development application that includes a source code editor, build automation tools, and/or debugging tools. In some examples, IDE 124 may also include one or more compilers and/or interpreters. SLOs 126 may be performance objectives for various aspects of the computer-implemented service defined by source code 130. In various examples, the SLOs 126 may be associated with an SLA. Java annotations 128 may be provided to represent the SLOs 126 in the source code. In turn, the annotated source code may be provided to OpenSLO generator 122 (e.g., an annotation processor) that may generate the OpenSLO document 151 upon compilation of the source code 130.

Below is an example of an OpenSLO document 151 and a corresponding Java definition:

```
1   apiVersion: openslo/v1alpha
2   kind: SLO
3   metadata:
4     displayName: My amazing SLO
5     name: my-amazing-slo
6   spec:
7     budgetingMethod: Occurrences
8     description: Latency Alert
9     indicator:
10      thresholdMetric:
11        source: Prometheus
12        queryType: promql
13        query:
latency_west_c7{code="ALL",instance="localhost:3000",job="prometheus", service="globacount"}
14      objectives:
15      - displayName: Weiner Shirt-zel Front Page
16        op: gt
17        target: 0.99
18        value: 2000
19      service: my-awesome-service
20      time Windows:
21      - calendar:
22          startTime: "2021-05-01 00:00:00"
23          timeZone: UTC
24        count: 1
25        isRolling: false
26        unit: Month
```

The corresponding Java definition (e.g., of the source code) may be:

```
10  public class SampleService {
11
12      @Metadata(name="my-amazing-slo", displayName="My amazing SLO")
13      @BudgetingMethod(Budgeting.OCCURRENCES)
14      @Description("Latency Alert")
15      @Indicator( @ThresholdMetric( source="prometheus", queryType="promql",
query="latency_west_c7{code='ALL',instance='localhost:3000' ,job='prometheus' , service='globacount'}" ))
16      @Objectives({
17        @Objective(displayName="Weiner Shirt-zel Front Page", op=">" target="0.99", value="2000")
18        , b=3)
19      })
20      @TimeWindows({
21        @Time Window(
22          @Calendar(startTime="2021-05-01 00:00:00", timeZone="UTC"),
23          count=1,
24          isRolling=false,
25          unit=Units.MONTH
26        )
27      })
28      @GET
29      @Produces(MediaType.TEXT_PLAIN)
30      @Path("myPath")
31      public String myAwesomeService(){ ... }
32
33  }
```

(displayName="Weiner Shirt-zel Front Page", op=">", target="0.99", value="2000"). Accordingly, the SLO defined using this Java annotation is included at lines 15-18 of the OpenSLO document 151 above. Declarative programming For example, the Java annotation at line 12 of the Java source code (e.g., @Metadata(name="my-amazing-slo", displayName="My amazing SLO") may define a name of the OpenSLO document 151. Accordingly, at line 4 of the OpenSLO document 151 above, the displayName field has the value "My amazing SLO" as defined in the Java annotation.

Additionally, the Java annotations at lines 16 and 17 provide the SLO which indicates that a value of 2000 should be exceeded 99% of the time (e.g., @ Objective is used at lines 28-30 of the Java definition to provide actions (e.g., GET, and Produces(MediaType.TEXT_PLAIN)) and a uniform resource locator (URL) (e.g., Path("myPath") for the computer-implemented service that is defined by the source code (e.g., myAwesomeService( ){ ... }). Other Java annotation may be provided to generate other SLOs in the OpenSLO document 151. Additionally, an annotation parser (e.g., OpenSLO generator 122) may use Java annotation to determine a path at which to publish the OpenSLO document 151 and/or may define one or more scripts that may be used to evaluate the service (as described in further detail below). The OpenSLO generator 122 includes logic to parse source code 130 including Java annotations 128 to populate the relevant fields of the OpenSLO document 151.

Figure 2:
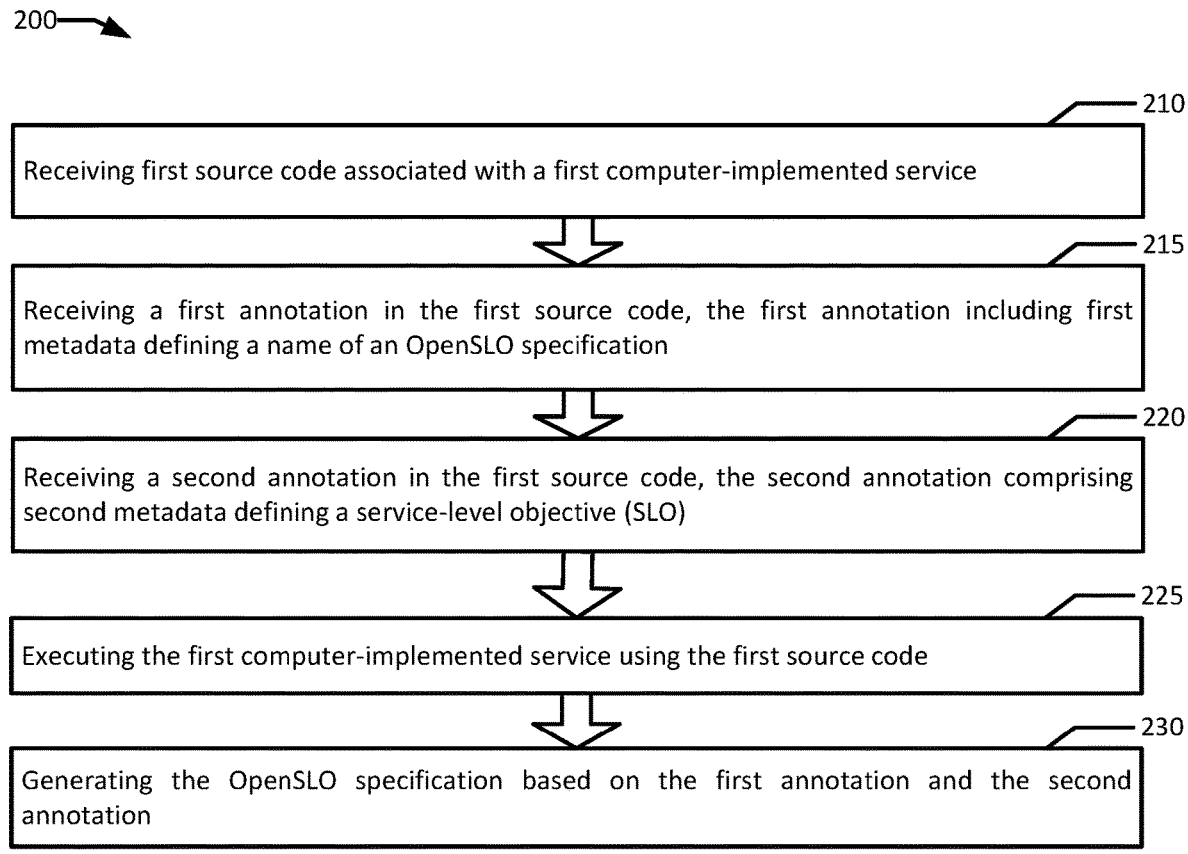
FIG. 2 is flowchart illustrating an example process for generating OpenSLO specifications using annotations, according to an example of the present disclosure.

FIG. 2 is flowchart illustrating an example process 200 for generating OpenSLO specifications using annotations, according to an example of the present disclosure. Although the example process 200 is described with reference to the flowchart illustrated in FIG. 2, it will be appreciated that many other methods of performing the acts associated with the process 200 may be used. For example, the order of some of the blocks may be changed, certain blocks may be combined with other blocks, blocks may be repeated, and some of the blocks described may be optional. The process 200 may be performed by processing logic that may comprise hardware (circuitry, dedicated logic, etc.), software, or a combination of both. In some examples, the actions described in the blocks of the process 200 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 200 includes receiving first source code associated with a first computer-implemented service (block 210). For example, first source code defining the first computer-implemented service may be entered into an IDE by a developer. The first computer-implemented service may be associated with an SLA and one or more SLOs.

In an example, the process 200 may include receiving a first annotation in the first source code. The first annotation may include first metadata defining a name of an OpenSLO specification (block 215). For example, the developer may use a Java annotation to provide a name of an OpenSLO specification (e.g., an OpenSLO document) for the first computer-implemented service.

The process 200 may include receiving a second annotation in the first source code. The second annotation may comprise second metadata defining an SLO (block 220). For example, there may be an SLO associated with a latency requirement for a particular aspect of the first computer-implemented service. The second annotation may define the SLO and may be used to programmatically populate the relevant fields of the OpenSLO specification during compile time.

In an example, the process 200 may include executing the first computer-implemented service using the first source code (block 225). In various examples, the first source code is compiled in order to generate machine language that can be executed by a computing device. The first computer-implemented service may be defined by the first source code.

In an example, the process 200 may include generating the OpenSLO specification based on the first annotation and the second annotation (block 230). In various examples, during compilation of the first source code, the first source code may be parsed to identify the annotations by an annotation processor. The annotation processor may programmatically generate the OpenSLO specification with the name specified by the first annotation and with a definition of the SLO related to the first aspect of the first computer-implemented service.

Figure 3:
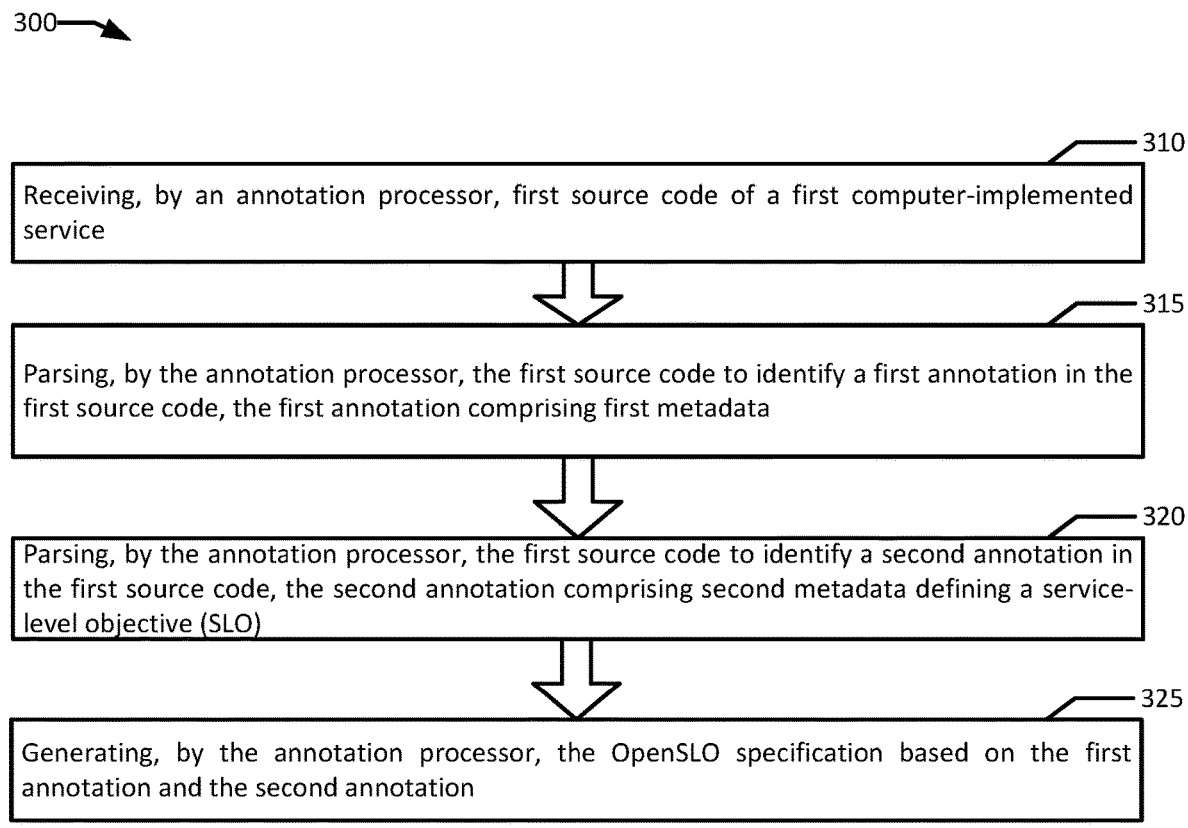
FIG. 3 is flowchart illustrating an example process for generating OpenSLO specifications using an annotation processor according to an example of the present disclosure.

FIG. 3 is flowchart illustrating an example process 300 for generating OpenSLO specifications using an annotation processor according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In various examples, the process 300 may include receiving, by an annotation processor, first source code of a first computer-implemented service (block 310). For example, first source code defining the first computer-implemented service may be entered into an IDE by a developer. The first computer-implemented service may be associated with an SLA and one or more SLOs. The annotation processor may receive the first source code during compilation of the first source code.

The process 300 may include parsing, by the annotation processor, the first source code to identify a first annotation in the first source code, the first annotation comprising first metadata (block 315). In various examples, the first annotation may pertain to a field of an OpenSLO specification that may be programmatically generated by the annotation processor during compilation of the first source code. For example, the first annotation may be a Java annotation that may be used to define an SLO to be included in the OpenSLO specification.

The process 300 may include parsing, by the annotation processor, the first source code to identify a second annotation in the first source code, the second annotation comprising second metadata defining an SLO (block 320). For example, there may be an SLO associated with a throughput requirement for a particular aspect of the first computer-implemented service. The second annotation may define the SLO and may be used by the annotation processor to programmatically populate the relevant fields of the OpenSLO specification during compile time.

In some examples, process 300 may include generating, by the annotation processor, the OpenSLO specification based on the first annotation and the second annotation (block 325). As previously described, the annotations of the first source code may define the OpenSLO specification to be generated by the annotation processor during compilation of the first source code. Accordingly, various annotations (e.g., Java annotations) included in the first source code may define and/or provide values or other data to be used to populate the OpenSLO specification template to generate the relevant OpenSLO specification for the first computer-implemented service.

Figure 4:
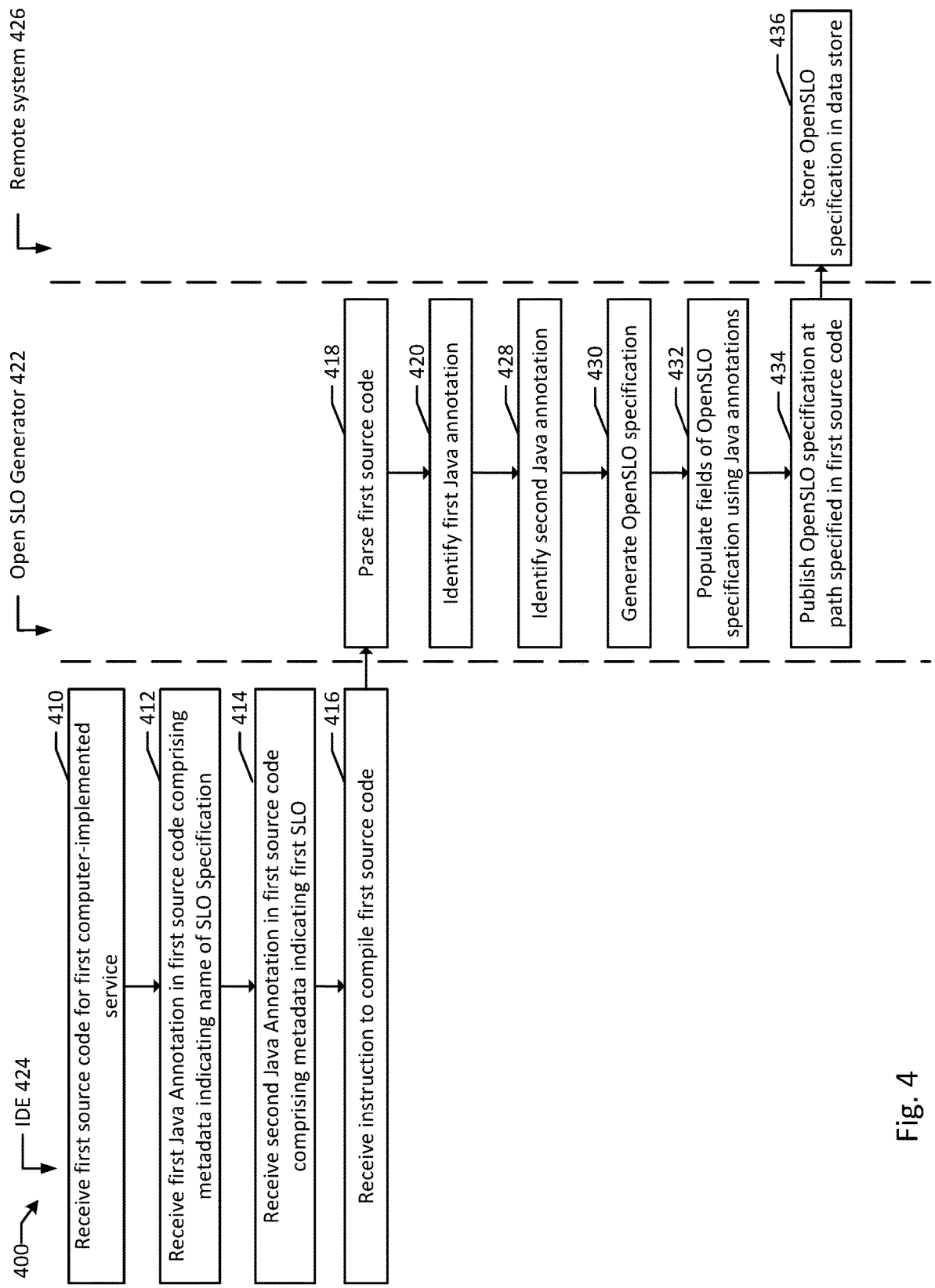
FIG. 4 illustrates a flow diagram of an example generation of OpenSLO specifications using annotations, according to various aspects of the present disclosure.

FIG. 4 illustrates a flow diagram of an example generation of OpenSLO specifications using annotations, according to various aspects of the present disclosure. Although the examples below are described with reference to the flow diagram illustrated in FIG. 4, many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, an IDE 424 may receive first source code for a first computer-implemented service (e.g., a cloud-based application) (block 410). The IDE 424 may receive a first Java annotation in the first source code (block 412). The first Java annotation may include metadata that indicates the name of an SLO specification. In various examples, declaration of the name of the SLO specification may be used to generate the SLO specification with the specified name (i.e., the SLO specification may not yet exist) during compilation of the first source code.

The IDE 424 may receive a second Java annotation in the first source code (block 414). The second Java annotation may include metadata indicating a first SLO (e.g., an SLO associated with an SLA for the first computer-implemented service). IDE 424 may receive an instruction to compile the first source code (block 416). The compilation may be performed by a compiler of the IDE 424 or may be performed by a separate compiler.

Open SLO generator 422 (e.g., an annotation processor) may parse the first source code (block 418) and may identify the first Java annotation (block 420) and the second Java annotation (block 428). The annotation processor may generate the OpenSLO specification (block 430) that includes the name specified by the first Java annotation and that includes the SLO defined by the second Java annotation. The OpenSLO generator 422 may use the metadata included in the Java annotations to generate the corresponding OpenSLO YAML descriptor. The OpenSLO generator 422 may populate the fields of the corresponding OpenSLO YAML descriptors using the metadata included in the Java annotations (block 432). In some further examples, the OpenSLO generator 422 may use Java annotations to generate markup based documentation (e.g., HTML, pdf, etc.) describing the first computer-implemented service and/or the OpenSLO specification. Further, the OpenSLO generator 422 may publish the OpenSLO specification at a path specified in the first source code (e.g., using a third Java annotation) (block 434). In various examples, the OpenSLO specification may be published by a remote system 426. Accordingly, the remote system 426 (e.g., a web server) may store the OpenSLO specification in a data store (block 436).

Figure 5:
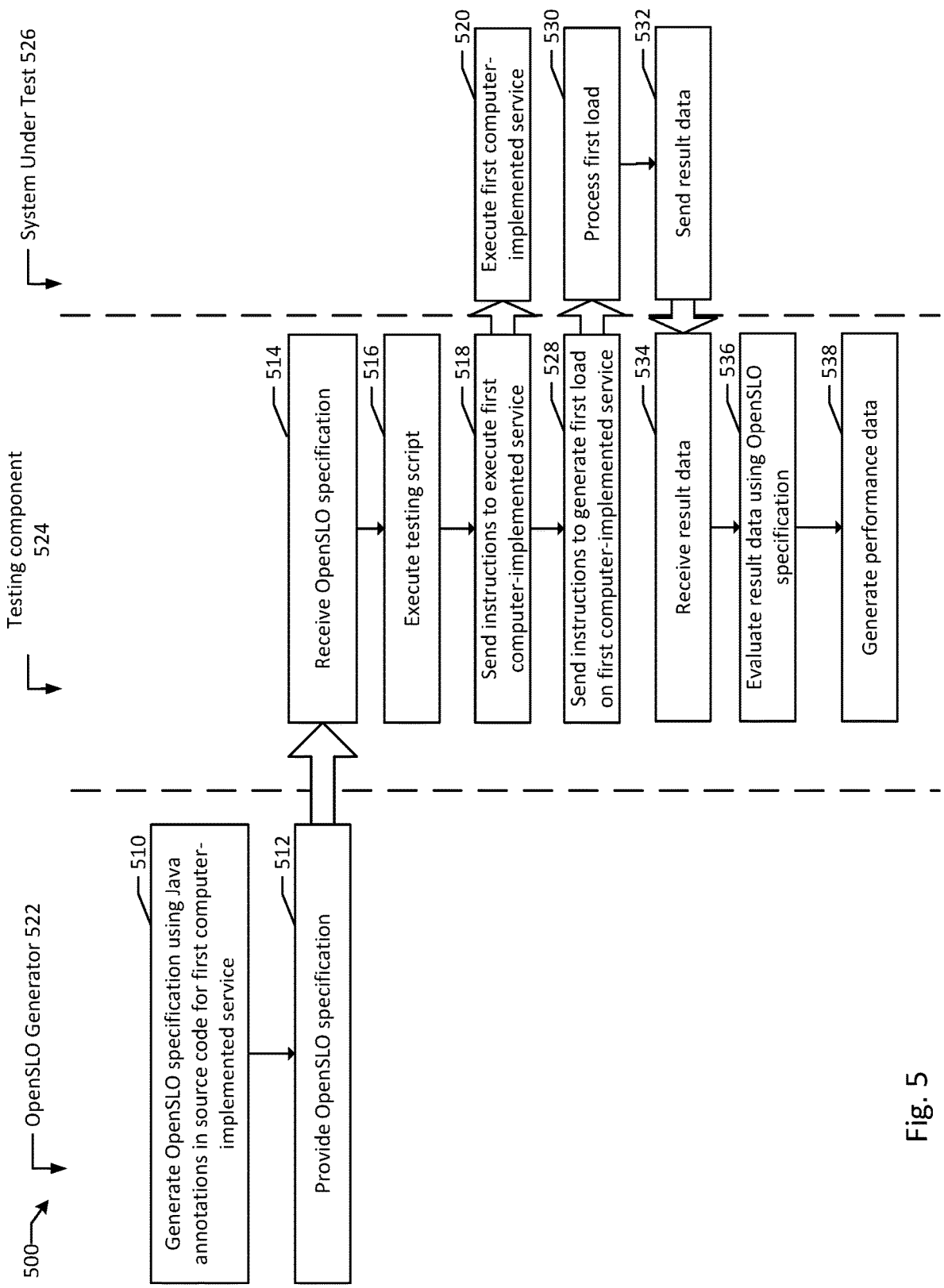
FIG. 5 illustrates a flow diagram of an example of testing a computer-implemented service using an OpenSLO specification generated using annotations, according to various aspects of the present disclosure.

FIG. 5 illustrates a flow diagram of an example of testing a computer-implemented service using an OpenSLO specification generated using annotations, according to various aspects of the present disclosure. Although the examples below are described with reference to the flow diagram illustrated in FIG. 5, many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example 500, an OpenSLO generator 522 (e.g., an annotation processor and/or compiler) may generate an OpenSLO specification for a first computer-implemented service using Java annotations included in the source code for the first computer-implemented service (block 510). The OpenSLO specification may be provided to a testing component 524 (block 512). In various examples, Java annotations included in the source code may be used to generate testing scripts that can be executed (e.g., by the testing component). The testing scripts may reference various YAML descriptors of the OpenSLO specification for the first computer-implemented service. Accordingly, in some examples, both the testing scripts and the OpenSLO specification may be programmatically generated from the first source code by an annotation processor using annotations included in the first source code. Additionally, the testing scripts may reference the various YAML descriptors of the OpenSLO specification to determine whether or not various SLOs defined in the OpenSLO specification are being met when the first computer-implemented service is subjected to some compute load (also specified by the testing scripts).

The testing component 524 may receive the OpenSLO specification (block 514) and may execute the testing script(s) (block 516). The testing component 524 may send instructions to execute the first computer-implemented service (block 518) to a system under test 526. In various examples, the system under test 526 may represent a desired deployment (e.g., using one or more clusters, nodes, VMs, Docker containers, etc.) of the first computer-implemented service. The system under test 526 may execute the first computer-implemented service (block 520) according to configuration data provided by testing component 524 (not shown in FIG. 5). In various examples, the configuration data may be generated using the testing scripts and may be specified using Java annotations in the source code.

The testing component 524 may send instructions to the system under test 526 to generate a first load on the first computer-implemented service (block 528). For example, the testing component 524 may specify an amount of traffic sent to a first service of the first computer-implemented service. The system under test 526 may process the first load (block 530) and may determine the relevant results according to instructions provided by the testing component 524 (as part of the testing script(s)) (block 532). For example, the average latency and/or throughput during a specified time period may be provided as result data. The testing component 524 may receive the result data (block 534) and may programmatically evaluate the result data using the OpenSLO specification (block 536). In various examples, the result data may be evaluated by the testing scripts. The testing component 524 may generate performance data (block 538). The performance data may indicate whether the first computer-implemented service is meeting one or more SLOs defined by the OpenSLO specification. The Java annotations in the first source code may be used to generate the testing scripts based on a combination of SLO-specific Java annotations and testing annotations (e.g., JAX-RS or similar) and can be used to programmatically evaluate the first computer-implemented service.

Figure 6:
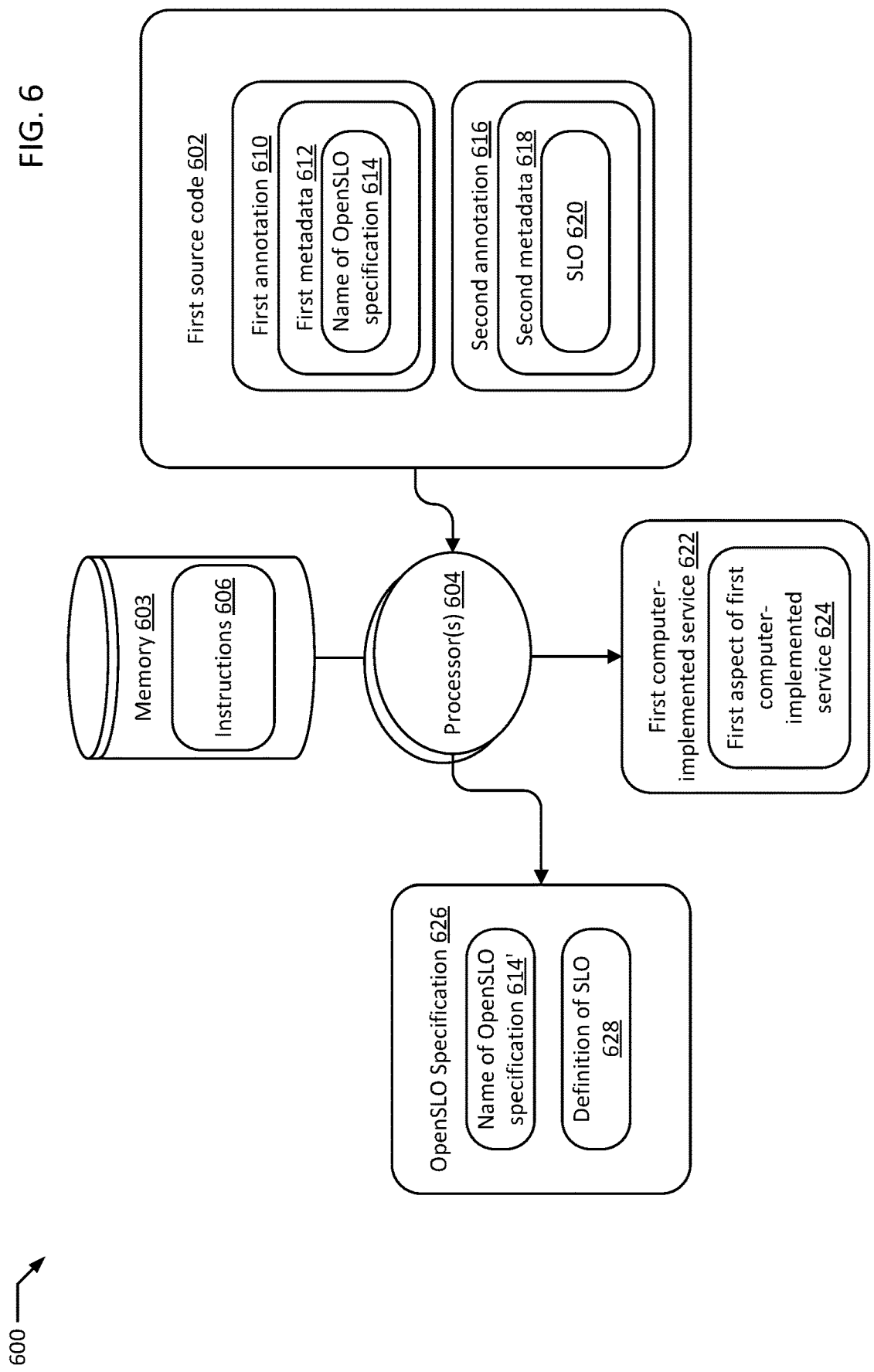
FIG. 6 is block diagram of a system effective to generate an OpenSLO specification using annotations, according to an example of the present disclosure.

FIG. 6 is block diagram of a system 600 effective to generate an OpenSLO specification 626 using annotations (e.g., first annotation 610 and/or second annotation 616), according to an example of the present disclosure.

System 600 may comprise at least one processor 604 and non-transitory computer-readable memory 603. The memory 603 may store instructions 606. The instructions 606 may be executed by the at least one processor 604 to perform various techniques described herein related to generation of the OpenSLO specification 626.

The at least one processor 604 may receive the first source code 602. The first source code 602 may define the functionality of a first computer-implemented service 622. The at least one processor 604 may receive a first annotation 610 in the first source code 602. The first annotation 610 may comprise first metadata 612 that defines a name of an OpenSLO specification 614. The at least one processor 604 may receive a second annotation 616 in the first source code 602. The second annotation 616 may comprise second metadata 618 that defines an SLO 620 of a first aspect of the first computer-implemented service 624.

In some examples, the at least one processor 604 may execute the first computer-implemented service 622 using the first source code 602. In some further examples, the at least one processor 604 may generate the OpenSLO specification 626 using the first annotation 610 and the second annotation 616. The OpenSLO specification 626 may comprise the name of the OpenSLO specification 614' and a definition of the SLO 628 of the first aspect of the first computer-implemented service 622.

Figure 7:
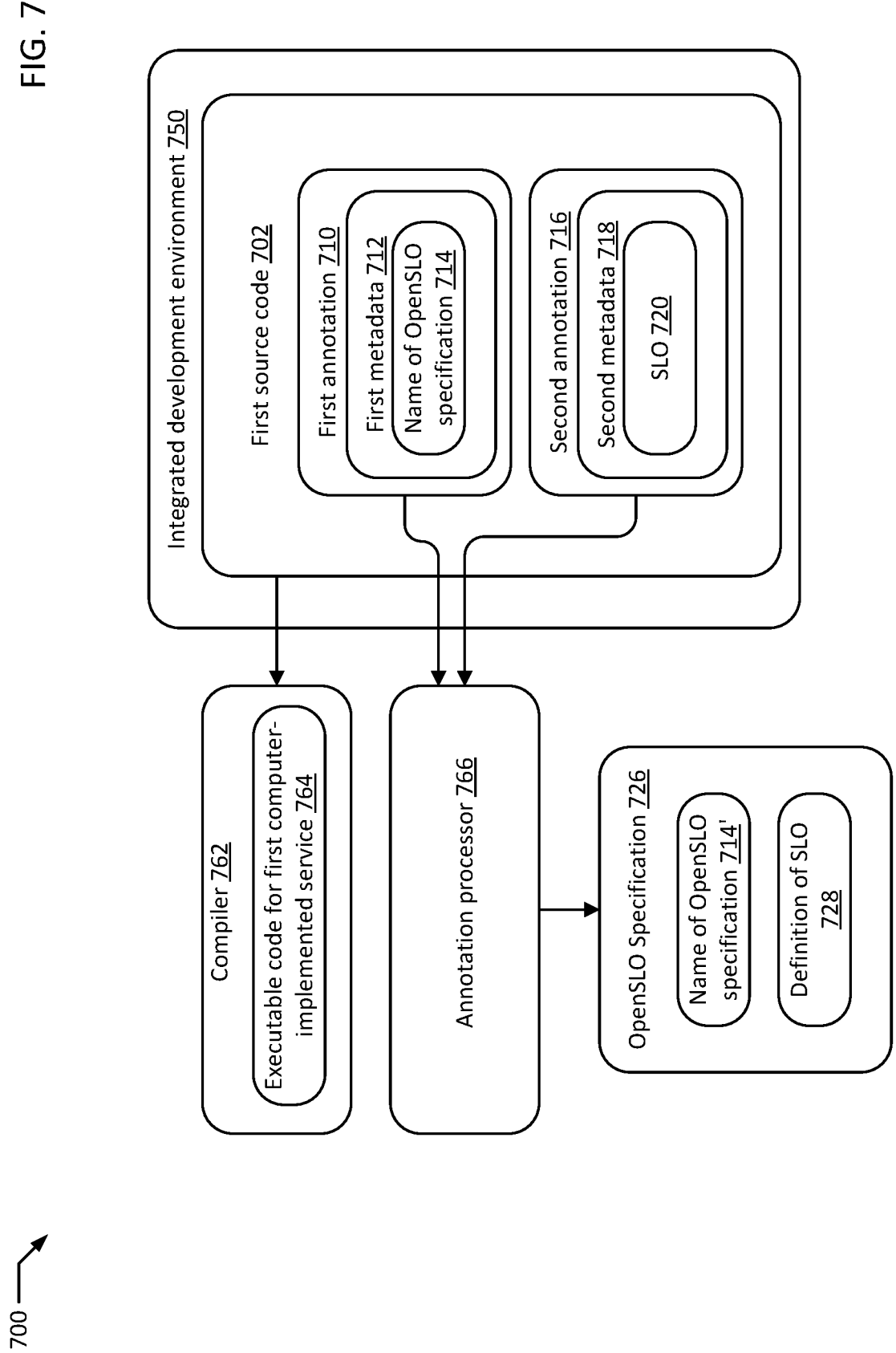
FIG. 7 is block diagram of an annotation processor in communication with an integrated development environment according to an example of the present disclosure.

FIG. 7 is block diagram 700 of an annotation processor 766 in communication with an integrated development environment 750 according to an example of the present disclosure. The integrated development environment 750 may receive first source code 702 that is associated with a first computer-implemented service. The integrated development environment 750 may receive a first annotation 710 in the first source code 702. The first annotation 710 may include first metadata 712 defining a name of an OpenSLO specification 714.

The integrated development environment 750 may receive a second annotation 716 in the first source code 702. The second annotation 716 may include second metadata 718 defining an SLO 720 of a first aspect of the first computer-implemented service. The compiler 762 may receive the first source code 702 and may compile the first source code 702 to generate executable code for the first computer-implemented service 764.

Annotation processor 766 may receive the first annotation 710 from the first source code 702 and the second annotation 716 from the first source code 702. Annotation process 766 may generate the OpenSLO specification 726 based on the first annotation 710 and the second annotation 716. The OpenSLO specification 726 may include the name of the OpenSLO specification 714' and the definition of the SLO 728 of the first aspect of the first computer-implemented service.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a method comprises receiving first source code associated with a first computer-implemented service; receiving a first annotation in the first source code, the first annotation comprising first metadata defining a name of an OpenSLO specification; receiving a second annotation in the first source code, the second annotation comprising second metadata defining a service-level objective (SLO) of a first aspect of the first computer-implemented service; executing the first computer-implemented service using the first source code; and generating the OpenSLO specification based on the first annotation and the second annotation, the OpenSLO specification including the name and a definition of the SLO of the first aspect of the first computer-implemented service.

In accordance with a 2nd example aspect of the present disclosure, which may be used in combination with any one or more of other aspects described herein (e.g., the 1st aspect), wherein the first annotation and the second annotation are Java annotations.

In accordance with a 3rd example aspect of the present disclosure, which may be used in combination with any one or more of other aspects described herein (e.g., the 1st aspect), compiling the first source code, wherein the OpenSLO specification is generated using the first metadata and the second metadata during compilation of the first source code.

In accordance with a 4th example aspect of the present disclosure, which may be used in combination with any one or more of other aspects described herein (e.g., the 3rd aspect), wherein an annotation processor generates the OpenSLO specification during the compilation of the first source code.

In accordance with a 5th example aspect of the present disclosure, which may be used in combination with any one or more of other aspects described herein (e.g., the 1st aspect), further comprising generating a third annotation in the first source code, the third annotation comprising third metadata defining a uniform resource locator (URL) at which the OpenSLO specification is published.

In accordance with a 6th example aspect of the present disclosure, which may be used in combination with any one or more of other aspects described herein (e.g., the 1st aspect), generating, using at least one script, a first load for the first computer-implemented service; receiving, by the at least one script, the OpenSLO specification as an input; determining first metric data describing performance of the first aspect of the first computer-implemented service; and comparing the first metric data to the SLO of the first aspect of the first computer-implemented service.

In accordance with a 7th example aspect of the present disclosure, which may be used in combination with any one or more of other aspects described herein (e.g., the 6th aspect), determining, using the at least one script, that the first metric data does not meet the SLO; and generating first output data indicating that the first metric data does not meet the SLO.

In accordance with an 8th example aspect of the present disclosure, which may be used in combination with any one or more of other aspects described herein (e.g., the 1st aspect), generating, using the first metadata, a first YAML descriptor in the OpenSLO specification.

In accordance with a 9th example aspect of the present disclosure, which may be used in combination with any one or more of other aspects described herein (e.g., the 1st aspect), wherein the OpenSLO specification comprises a standardized definition for defining service-level objectives (SLOs).

In accordance with a 10th example aspect of the present disclosure, which may be used in combination with any one or more of other aspects described herein (e.g., the 1st aspect), wherein the second metadata logically maps to a field of the OpenSLO specification that is associated with the first aspect of the first computer-implemented service.

Aspects of the subject matter described herein may be useful alone or in combination with one or more other aspects described herein. In a 11th example aspect of the present disclosure, a system comprises at least one processor; and non-transitory computer-readable memory storing instructions that, when executed by the at least one processor are configured to: receive first source code defining a first computer-implemented service; receive a first annotation in the first source code, the first annotation comprising first metadata defining a name of an OpenSLO specification; receive a second annotation in the first source code, the second annotation comprising second metadata defining a service-level objective (SLO) of a first aspect of the first computer-implemented service; execute the first computer-implemented service using the first source code; and generate the OpenSLO specification based on the first annotation and the second annotation, the OpenSLO specification including the name and a definition of the SLO of the first aspect of the first computer-implemented service.

In accordance with a 12th example aspect of the present disclosure, which may be used in combination with any one or more of other aspects described herein (e.g., the 11th aspect), wherein the first annotation and the second annotation are Java annotations.

In a 13th example aspect of the present disclosure, which may be used in combination with any one or more of other aspects described herein (e.g., the 11th aspect), compiling the first source code, wherein the OpenSLO specification is generated using the first metadata and the second metadata during compilation of the first source code.

In a 14th example aspect of the present disclosure, which may be used in combination with any one or more of other aspects described herein (e.g., the 13th aspect), wherein an annotation processor generates the OpenSLO specification during the compilation of the first source code.

In a 15th example aspect of the present disclosure, which may be used in combination with any one or more of other aspects described herein (e.g., the 11th aspect), the non-transitory computer-readable memory storing further instructions that, when executed by the at least one processor are further configured to generate a third annotation in the first source code, the third annotation comprising third metadata defining a uniform resource locator (URL) at which the OpenSLO specification is published.

In a 16th example aspect of the present disclosure, which may be used in combination with any one or more of other aspects described herein (e.g., the 11th aspect), the non-transitory computer-readable memory storing further instructions that, when executed by the at least one processor are further configured to: generate, using at least one script, a first load for the first computer-implemented service; receive, by the at least one script, the OpenSLO specification as an input; determine first metric data describing performance of the first aspect of the first computer-implemented service; and compare the first metric data to the SLO of the first aspect of the first computer-implemented service.

In accordance with a 17th example aspect of the present disclosure, which may be used in combination with any one or more of other aspects described herein (e.g., the 16th aspect), the non-transitory computer-readable memory storing further instructions that, when executed by the at least one processor are further configured to: determine, using the at least one script, that the first metric data does not meet the SLO; and generate first output data indicating that the first metric data does not meet the SLO.

In accordance with a 18th example aspect of the present disclosure, which may be used in combination with any one or more of other aspects described herein (e.g., the 11th aspect), the non-transitory computer-readable memory storing further instructions that, when executed by the at least one processor are further configured to generate, using the first metadata, a first YAML descriptor in the OpenSLO specification.

In accordance with a 19th example aspect of the present disclosure, which may be used in combination with any one or more of other aspects described herein (e.g., the 11th aspect), wherein the OpenSLO specification comprises a standardized definition for defining service-level objectives (SLOs).

In accordance with a 20th example aspect of the present disclosure, which may be used in combination with any one or more of other aspects described herein (e.g., the 11th aspect), wherein the second metadata logically maps to a field of the OpenSLO specification that is associated with the first aspect of the first computer-implemented service.

Aspects of the subject matter described herein may be useful alone or in combination with one or more other aspects described herein. In a 21st example aspect of the present disclosure, a system comprises an integrated development environment; a compiler; and an annotation processor; the integrated development environment effective to: receive first source code associated with a first computer-implemented service; receive a first annotation in the first source code, the first annotation comprising first metadata defining a name of an OpenSLO specification; and receive a second annotation in the first source code, the second annotation comprising second metadata defining a service-level objective (SLO) of a first aspect of the first computer-implemented service; the compiler effective to compile the first source code to generate executable code for the first computer-implemented service; and the annotation processor effective to: receive the first annotation from the first source code; receive the second annotation from the first source code; and generate the OpenSLO specification based on the first annotation and the second annotation, the OpenSLO specification including the name and a definition of the SLO of the first aspect of the first computer-implemented service.

In accordance with a 22nd example aspect of the present disclosure, which may be used in combination with any one or more of other aspects described herein (e.g., the 21st aspect), wherein the first annotation and the second annotation are Java annotations.

In accordance with a 23rd example aspect of the present disclosure, which may be used in combination with any one or more of other aspects described herein (e.g., the 21st aspect), wherein the OpenSLO specification is generated using the first metadata and the second metadata by the annotation processor during compilation of the first source code.

In accordance with a 24th example aspect of the present disclosure, which may be used in combination with any one or more of other aspects described herein (e.g., the 21st aspect), the integrated development environment further effective to receive a third annotation in the first source code, the third annotation comprising third metadata defining a uniform resource locator (URL) at which the OpenSLO specification is published.

In accordance with a 25th example aspect of the present disclosure, which may be used in combination with any one or more of other aspects described herein (e.g., the 21st aspect), further comprising a second computer-implemented service, wherein the second computer-implemented service is effective to: generate, using at least one script, a first load for the first computer-implemented service; receive, by the at least one script, the OpenSLO specification as an input; determine first metric data describing performance of the first aspect of the first computer-implemented service; and compare the first metric data to the SLO of the first aspect of the first computer-implemented service.

In accordance with a 26th example aspect of the present disclosure, which may be used in combination with any one or more of other aspects described herein (e.g., the 25th aspect), wherein the second computer-implemented service is further effective to: determine, using the at least one script, that the first metric data does not meet the SLO; and generate first output data indicating that the first metric data does not meet the SLO.

In accordance with a 27th example aspect of the present disclosure, which may be used in combination with any one or more of other aspects described herein (e.g., the 21st aspect), wherein the annotation processor effective to generate, using the first metadata, a first YAML descriptor in the OpenSLO specification.

In accordance with a 28th example aspect of the present disclosure, which may be used in combination with any one or more of other aspects described herein (e.g., the 21st aspect), wherein the OpenSLO specification comprises a standardized definition for defining service-level objectives (SLOs).

In accordance with a 29th example aspect of the present disclosure, which may be used in combination with any one or more of other aspects described herein (e.g., the 21st aspect), wherein the second metadata logically maps to a field of the OpenSLO specification that is associated with the first aspect of the first computer-implemented service.

Aspects of the subject matter described herein may be useful alone or in combination with one or more other aspects described herein. In a 30th example aspect of the present disclosure, a method comprising: receiving, by an annotation processor, first source code of a first computer-implemented service; parsing, by the annotation processor, the first source code to identify a first annotation in the first source code, the first annotation comprising first metadata defining a name of an OpenSLO specification; parsing, by the annotation processor, the first source code to identify a second annotation in the first source code, the second annotation comprising second metadata defining a service-level objective (SLO) of a first aspect of the first computer-implemented service; generating, by the annotation processor, the OpenSLO specification based on the first annotation and the second annotation, the OpenSLO specification including the name and a definition of the SLO of the first aspect of the first computer-implemented service.

In accordance with a 31st example aspect of the present disclosure, which may be used in combination with any one or more of other aspects described herein (e.g., the 30th aspect), wherein the first annotation and the second annotation are Java annotations.

In accordance with a 32nd example aspect of the present disclosure, which may be used in combination with any one or more of other aspects described herein (e.g., the 30th aspect), further comprising compiling the first source code, wherein the OpenSLO specification is generated using the first metadata and the second metadata during compilation of the first source code.

In accordance with a 33rd example aspect of the present disclosure, which may be used in combination with any one or more of other aspects described herein (e.g., the 32nd aspect), wherein the annotation processor generates the OpenSLO specification during the compilation of the first source code.

Aspects of the subject matter described herein may be useful alone or in combination with one or more other aspects described herein. In a 34th example aspect of the present disclosure, a system comprising: a means for generating first source code of a first computer-implemented service; a means for generating a first annotation in the first source code, the first annotation comprising first metadata defining a name of an OpenSLO specification; a means for generating a second annotation in the first source code, the second annotation comprising second metadata defining a service-level objective (SLO) of a first aspect of the first computer-implemented service; a means for executing the first computer-implemented service using the first source code; and a means for generating the OpenSLO specification based on the first annotation and the second annotation, the OpenSLO specification including the name and a definition of the SLO of the first aspect of the first computer-implemented service.

In accordance with a 35th example aspect of the present disclosure, which may be used in combination with any one or more of other aspects described herein (e.g., the 34th aspect), further comprising a means for compiling the first source code, wherein the OpenSLO specification is generated using the first metadata and the second metadata during compilation of the first source code.

In accordance with a 36th example aspect of the present disclosure, which may be used in combination with any one or more of other aspects described herein (e.g., the 35th aspect), wherein an annotation processor generates the OpenSLO specification during the compilation of the first source code.

In accordance with a 37th example aspect of the present disclosure, which may be used in combination with any one or more of other aspects described herein (e.g., the 34th aspect) further comprising a means for generating a third annotation in the first source code, the third annotation comprising third metadata defining a uniform resource locator (URL) at which the OpenSLO specification is published.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving first source code associated with a first computer-implemented service;
receiving a first annotation in the first source code, the first annotation comprising first metadata defining a service-level objective (SLO) of a first aspect of the first computer-implemented service;
receiving a second annotation in the first source code, the second annotation comprising second metadata associated with an SLO specification;
compiling the first source code to generate first compiled code;
executing the first computer-implemented service using the first compiled code;
generating the SLO specification based on the first annotation, the SLO specification including a definition of the SLO of the first aspect of the first computer-implemented service, wherein the SLO specification is generated using the first metadata during processing of the first source code; and generating, using the second metadata, a yet another markup language (YAML) descriptor in the SLO specification.

2. The method of claim 1, wherein the second metadata defines a name of the SLO specification.

3. The method of claim 2, wherein the first annotation and the second annotation are Java annotations.

4. The method of claim 3, wherein an annotation processor generates the SLO specification during the processing of the first source code.

5. The method of claim 1, wherein the second metadata defines a uniform resource locator (URL) at which the SLO specification is published.

6. The method of claim 1, further comprising:
generating, using at least one script, a first load for the first computer-implemented service;
receiving, by the at least one script, the SLO specification as an input;
determining first metric data describing performance of the first aspect of the first computer-implemented service; and
comparing the first metric data to the SLO of the first aspect of the first computer-implemented service.

7. The method of claim 6, further comprising:
determining, using the at least one script, that the first metric data does not meet the SLO; and
generating first output data indicating that the first metric data does not meet the SLO.

8. The method of claim 1, wherein the SLO specification comprises a standardized definition for defining service-level objectives (SLOs).

9. The method of claim 1, wherein the first metadata logically maps to a field of the SLO specification that is associated with the first aspect of the first computer-implemented service.

10. A system comprising:
at least one processor; and
a non-transitory computer-readable memory storing instructions that, when executed by the at least one processor are configured to:
receive first source code defining a first computer-implemented service;
receive a first annotation in the first source code, the first annotation comprising first metadata defining a service-level objective (SLO) of a first aspect of the first computer-implemented service;
receive a second annotation in the first source code, the second annotation comprising second metadata associated with an SLO specification;
compile the first source code to generate first compiled code;
execute the first computer-implemented service using the first compiled code;
generate the SLO specification based on the first annotation, the SLO specification including a definition of the SLO of the first aspect of the first computer-implemented service, wherein the SLO specification is generated using the first metadata during processing of the first source code; and
generate, using the second metadata, a yet another markup language (YAML) descriptor in the SLO specification.

11. The system of claim 10, wherein the second metadata defines a name of the SLO specification.

12. The system of claim 11, wherein the first annotation and the second annotation are Java annotations.

13. The system of claim 12, wherein an annotation processor generates the SLO specification during the compilation of the first source code.

14. The system of claim 10, wherein the second metadata defines a uniform resource locator (URL) at which the SLO specification is published.

15. The system of claim 10, the non-transitory computer-readable memory storing further instructions that, when executed by the at least one processor are further configured to:
generate, using at least one script, a first load for the first computer-implemented service;
receive, by the at least one script, the SLO specification as an input;
determine first metric data describing performance of the first aspect of the first computer-implemented service; and
compare the first metric data to the SLO of the first aspect of the first computer-implemented service.

16. The system of claim 15, the non-transitory computer-readable memory storing further instructions that, when executed by the at least one processor are further configured to:
determine, using the at least one script, that the first metric data does not meet the SLO; and
generate first output data indicating that the first metric data does not meet the SLO.

17. A system comprising:
at least one processor; and
a non-transitory computer-readable memory storing instructions for an integrated development environment, a compiler, and an annotation processor;
the integrated development environment effective to:
receive first source code associated with a first computer-implemented service;
receive a first annotation in the first source code, the first annotation comprising first metadata defining a service-level objective (SLO) of a first aspect of the first computer-implemented service; and
receive a second annotation in the first source code, the second annotation comprising second metadata associated with an SLO specification;
the compiler effective to compile the first source code to generate executable code for the first computer-implemented service; and
the annotation processor effective to:
receive the first annotation from the first source code;
generate the SLO specification based on the first annotation, the SLO specification including a definition of the SLO of the first aspect of the first computer-implemented service, wherein the SLO specification is generated using the first metadata during processing of the first source code; and
generating, using the second metadata, a yet another markup language (YAML) descriptor in the SLO specification.

18. The system of claim 17, wherein the first annotation is a Java annotation.

* * * * *